US009332431B2

(12) United States Patent
Reitsma et al.

(10) Patent No.: US 9,332,431 B2
(45) Date of Patent: May 3, 2016

(54) METHOD OF AND SYSTEM FOR AUTHENTICATING AND OPERATING PERSONAL COMMUNICATION DEVICES OVER PUBLIC SAFETY NETWORKS

(71) Applicant: MOTOROLA SOLUTIONS, INC., Schaumburg, IL (US)

(72) Inventors: Katrin Reitsma, Chicago, IL (US); Steven S. Gilbert, Lake Zurich, IL (US); Hemang F. Patel, Hoffman Estates, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 573 days.

(21) Appl. No.: 13/728,598

(22) Filed: Dec. 27, 2012

(65) Prior Publication Data

US 2014/0187189 A1 Jul. 3, 2014

(51) Int. Cl.

| | |
|---|---|
| ***H04W 4/22*** | (2009.01) |
| ***H04W 12/06*** | (2009.01) |
| ***H04W 76/00*** | (2009.01) |
| ***H04L 29/06*** | (2006.01) |
| ***H04L 9/32*** | (2006.01) |
| *H04W 88/04* | (2009.01) |
| *H04W 92/18* | (2009.01) |

(52) U.S. Cl.

CPC ............ *H04W 12/06* (2013.01); *H04L 9/3215* (2013.01); *H04L 9/3234* (2013.01); *H04L 63/0807* (2013.01); *H04W 76/007* (2013.01); *H04L 2209/80* (2013.01); *H04W 4/22* (2013.01); *H04W 88/04* (2013.01); *H04W 92/18* (2013.01)

(58) Field of Classification Search

CPC ............................ H04W 12/12; H04W 12/06

See application file for complete search history.

(56) References Cited

U.S. PATENT DOCUMENTS

| | | | |
|---|---|---|---|
| 6,876,643 | B1 | 4/2005 | Aggarwal et al. |
| 7,243,231 | B2 | 7/2007 | Ellison et al. |
| 7,392,387 | B2 | 6/2008 | Balfanz et al. |

(Continued)

FOREIGN PATENT DOCUMENTS

| | | |
|---|---|---|
| CN | 1473310 A | 2/2004 |
| EP | 1802155 A1 | 6/2007 |

(Continued)

OTHER PUBLICATIONS

"Performance of RFID Tags in Near and Far Field", Flores, etc., Personal Wireless Communications, 2005. ICPWC 2005 IEEE International Conference on, Jan. 23-25, 2005, pp. 353-357.

(Continued)

*Primary Examiner* — Khalid Shaheed
*Assistant Examiner* — Frank Donado
(74) *Attorney, Agent, or Firm* — Daniel R. Bestor

(57) ABSTRACT

A public safety (PS) person having a PS communications device is able to authenticate and authorize operation of a non-PS, personal communications device over a PS network. The PS device issues a challenge, and the personal device responds to the challenge, when the devices are in close proximity. A conditional token having specified conditions is sent to the personal device, which captures information at an incident scene. The personal device attaches the conditional token to the captured information, and uploads the captured information with the attached token to the PS device to permit distribution of the captured information in accordance with the specified conditions of the attached conditional token.

19 Claims, 3 Drawing Sheets

100

START — 102

103 GENERATING A CHALLENGE

104 ISSUING A CHALLENGE WITH THE PS DEVICE

106 ISSUING A RESPONSE TO THE CHALLENGE WITH THE PERSONAL DEVICE

108 VERIFYING THE RESPONSE

110 GENERATING A CONDITIONAL TOKEN

112 SENDING THE CONDITIONAL TOKEN TO THE PERSONAL DEVICE

114 CAPTURING DATA WITH THE PERSONAL DEVICE

116 UPLOADING THE CAPTURED DATA WITH ATTACHED TOKEN TO PERMIT DISTRIBUTION OF THE CAPTURED DATA IN ACCORDANCE WITH CONDITIONAL TOKEN

(56) References Cited

U.S. PATENT DOCUMENTS

| | | | | |
|---|---|---|---|---|
| 7,716,483 | B2 | 5/2010 | Sozzani et al. | |
| 7,925,022 | B2 | 4/2011 | Jung et al. | |
| 8,041,339 | B2 | 10/2011 | Teunissen et al. | |
| 8,090,945 | B2 | 1/2012 | Singhal | |
| 8,141,134 | B2 | 3/2012 | Brandt et al. | |
| 8,161,172 | B2 | 4/2012 | Reisman | |
| 8,195,126 | B1 * | 6/2012 | Houri | G06F 21/34 455/404.2 |
| 8,201,231 | B2 | 6/2012 | Williams et al. | |
| 8,205,247 | B2 | 6/2012 | Lexcellent et al. | |
| 8,220,035 | B1 | 7/2012 | Pravetz et al. | |
| 8,327,427 | B2 | 12/2012 | Soukup et al. | |
| 8,370,907 | B1 * | 2/2013 | Potter | G06F 11/3006 455/404.1 |
| 8,611,884 | B2 * | 12/2013 | Fan | H04M 3/02 455/404.1 |
| 2001/0041531 | A1 | 11/2001 | Haight et al. | |
| 2003/0026433 | A1 | 2/2003 | Matt | |
| 2003/0159072 | A1 | 8/2003 | Bellinger et al. | |
| 2004/0097217 | A1 | 5/2004 | McClain | |
| 2005/0198204 | A1 | 9/2005 | Takahashi | |
| 2005/0221813 | A1 | 10/2005 | Rajahalme et al. | |
| 2005/0266826 | A1 | 12/2005 | Vlad | |
| 2006/0083208 | A1 | 4/2006 | Lin | |
| 2006/0293028 | A1 | 12/2006 | Gadamsetty et al. | |
| 2007/0019616 | A1 | 1/2007 | Rantapuska et al. | |
| 2007/0022301 | A1 | 1/2007 | Nicholson et al. | |
| 2007/0194931 | A1 | 8/2007 | Miller et al. | |
| 2007/0202807 | A1 | 8/2007 | Kim | |
| 2007/0203850 | A1 | 8/2007 | Singh et al. | |
| 2007/0236586 | A1 | 10/2007 | Ryckman | |
| 2007/0254709 | A1 | 11/2007 | Higgins et al. | |
| 2007/0264976 | A1 | 11/2007 | Lessing et al. | |
| 2008/0083708 | A1 | 4/2008 | Hussary et al. | |
| 2008/0120711 | A1 | 5/2008 | Dispensa | |
| 2008/0172341 | A1 | 7/2008 | Crandell | |
| 2008/0222711 | A1 | 9/2008 | Michaelis et al. | |
| 2008/0268776 | A1 | 10/2008 | Amendola | |
| 2008/0278329 | A1 | 11/2008 | Kim et al. | |
| 2008/0320190 | A1 | 12/2008 | Lydon et al. | |
| 2008/0320587 | A1 | 12/2008 | Vauclair et al. | |
| 2009/0070472 | A1 | 3/2009 | Baldus et al. | |
| 2009/0083378 | A1 | 3/2009 | Lingafelt et al. | |
| 2009/0202079 | A1 | 8/2009 | Puputti et al. | |
| 2009/0249478 | A1 | 10/2009 | Rosener et al. | |
| 2009/0287922 | A1 | 11/2009 | Herwono et al. | |
| 2010/0005294 | A1 | 1/2010 | Kostiainen et al. | |
| 2010/0088390 | A1 | 4/2010 | Bai et al. | |
| 2010/0145860 | A1 | 6/2010 | Pelegero | |
| 2011/0028091 | A1 | 2/2011 | Higgins et al. | |
| 2011/0028125 | A1 | 2/2011 | Dehlinger et al. | |
| 2011/0030044 | A1 | 2/2011 | Kranendonk et al. | |
| 2011/0136470 | A1 | 6/2011 | Kurtz | |
| 2011/0167126 | A1 | 7/2011 | Yim et al. | |
| 2011/0212688 | A1 | 9/2011 | Griffin et al. | |
| 2011/0237217 | A1 | 9/2011 | Monks et al. | |
| 2011/0238995 | A1 | 9/2011 | Blanco et al. | |
| 2011/0282960 | A1 | 11/2011 | Lin | |
| 2012/0072503 | A1 | 3/2012 | Kowalewski | |
| 2012/0084364 | A1 | 4/2012 | Sivavakeesar | |
| 2012/0084565 | A1 | 4/2012 | Wittenberg et al. | |
| 2012/0100824 | A1 * | 4/2012 | Michael | H04W 4/22 455/404.2 |
| 2012/0117626 | A1 | 5/2012 | Yates et al. | |
| 2012/0144202 | A1 | 6/2012 | Counterman | |
| 2012/0179789 | A1 | 7/2012 | Griot et al. | |
| 2012/0184238 | A1 * | 7/2012 | Patel | H04M 3/42195 455/404.1 |
| 2012/0322402 | A1 * | 12/2012 | Sennett | H04W 4/001 455/404.1 |
| 2013/0018975 | A1 | 1/2013 | Higgins | |
| 2013/0102252 | A1 * | 4/2013 | Rasmussen | H04K 1/04 455/41.2 |
| 2013/0331053 | A1 * | 12/2013 | Vick | H04W 4/22 455/404.1 |

FOREIGN PATENT DOCUMENTS

| | | | |
|---|---|---|---|
| EP | 2068597 | A1 | 6/2009 |
| EP | 2456245 | A1 | 5/2012 |
| GB | 2365699 | A | 2/2002 |
| GB | 2478653 | A | 9/2011 |
| WO | 0221429 | A2 | 3/2002 |
| WO | 2005119931 | A1 | 12/2005 |
| WO | 2006027725 | A1 | 3/2006 |
| WO | 2006067281 | A1 | 6/2006 |
| WO | 2007107708 | A2 | 9/2007 |
| WO | 2009044228 | A2 | 4/2009 |
| WO | 2009058494 | A1 | 5/2009 |
| WO | 2009066212 | A1 | 5/2009 |
| WO | 2009070430 | A2 | 6/2009 |
| WO | 2009095048 | A1 | 8/2009 |
| WO | 2009104131 | A1 | 8/2009 |
| WO | 2009133419 | A1 | 11/2009 |
| WO | 2009140170 | A1 | 11/2009 |
| WO | 2011062726 | A1 | 5/2011 |

OTHER PUBLICATIONS

Assertions and Protocols for the Oasis Security Assertion Markup Language (SAML) V2.0; Oasis Standard, Mar. 15, 2005; 86 Pages; Editors Scott Cantor, et al.

Australian Patent Examination Report No. 1 issued on Jul. 1, 2013 in Australian Patent Application No. 2010281501.

Australian Patent Examination Report No. 2 issued on Aug. 23, 2013 in Australian Patent Application No. 2010281501.

Australian Patent Examination Report No. 1 issued on Sep. 6, 2013 in Australian Patent Application No. 2010349709.

Canadian Office Action mailed on Sep. 27, 2013 in Canadian Patent Application No. 2769331.

Chinese Office Action issued on Dec. 10, 2013 in Chinese Patent Application No. 201080034505.x.

Hocking C.G., et al. "A Distributed and Cooperative User Authentication Framework", Information Assurance and Security (IAS), 2010 Sixth International Confeence on, IEEE, Aug. 23, 2010, pp. 304-310, XP031777197, ISBN:978-1-4244-7407-3.

Jeffrey Fischer. "NFC in cell phones: The new paradigm for an interactive world". Communications Magazine, IEEE, vol. 47, No. 6, pp. 22-28, Jun. 2009.

Lishoy Francis, Gerhard Hancke, Keith Mayes, and Konstantinos Markantonakis. "Practical NFC Peer-to-Peer Relay Attack v Using Mobile Phones." in "RFI DSec'1 0 Proceedings of the 6th international conference on Radio frequency identification: security and privacy issues". Istanbul, Turkey, Jun. 8-9, 2010. pp. 35-49.

Marc Barish "Design and Evaluation of an Architecture for Ubiquitous User Authentication Based on Identity Management Systems", Trust, Security and Privacy in Computing and Communicatiions (Trustcom), 2011 IEEE 10th International Conference on, Nov. 16, 2011, p. 863-872, XP032086891, D01:10.1109/Trustcom.2011.116, ISBN:978-1-4577-2135-9.

Non Final Office Action mailed on Apr. 22, 2014 in related U.S. Appl. No. 13/183,930, Robert J Higgins, filed Jul. 15, 2011.

Notice of Allowance mailed Apr. 14, 2014 in U.S. Appl. No. 12/748,982, Alejandro G Blanco, filed Mar. 29, 2010.

PCT International Search Report dated Mar. 14, 2014 for Counterpart Application PCT/US2013/071850.

Yih-chun Hu, Adrian Perrig, and David B. Johnson. "Wormhole attacks in wireless networks". In IEEE Journal on SelectedAreas in Communications vol. 24. Published 2006 (month unknown). pp. 370-380.

Wikipedia Article, "Bump (application)", Feb. 17, 2012, http://en.wikipedia.org/wiki/Bump_(application).

"Otway-Rees protocol," Wikipedia, accessed at http://en.wikipedia.org/wiki/Otway%E2%80%93Rees_protocol, 2 pages, accessed on Sep. 11, 2013.

"SAML V2.0 Holder-of-Key Web Browser SSO Profile Version 1.0," accessed at http://docs.oasis-open.org/security/saml/Post2.0/sstc-saml-holder-of-key-browser-sso.pdf, Aug. 10, 2010, 24 pages.

(56) References Cited

OTHER PUBLICATIONS

Bradley, J. et al.,"The OAuth 2.0 Authorization Framework: Holder-of-the-Key Token Usage draft-tschofenig-oauth-hotk-01.txt," Network Working Group, Internet-Draft, pp. 23, Jul. 16, 2012.
Farrell, S. et al., "An Internet Attribute Certificate Profile for Authorization," Network Working Group, RFC 3281, pp. 1-41, Apr. 2002.
Final Office Action mailed on Apr. 24, 2013 in U.S. Appl. No. 12/748,982, Alejandro G Blanco, filed Mar. 29, 2010.
Final Office Action mailed Sep. 13, 2012 in related U.S. Appl. No. 12/534,246, Robert J. Higgins, filed Aug. 3, 2009.
Housley, R. et al., "Internet X.509 Public Key Infrastructure Certificate and Certificate Revocation List (CRL) Profile," Network Working Group, RFC 3280, pp. 1-130, Apr. 2002.
International Search Report and Written Opinion for International Application No. PCT/US2010/061217 mailed on Jun. 27, 2011.
International Search Report and Written Opinion for related International Application No. PCT/US2010/042825 mailed on Oct. 22, 2010.
International Search Report for related International Patent Application No. PCT/US2012/046014 mailed on Oct. 11, 2012.
Madsen, P., "Liberty ID-WSF Multi-Device SSO Deployment Guide," Version: 1.0-02, Liberty Alliance Project, pp. 1-13, 2008.
Non Final Office Action mailed Apr. 9, 2012 in related U.S. Appl. No. 12/534,246, Robert J. Higgins, filed Aug. 3, 2009.
Non Final Office Action mailed Oct. 4, 2012 in U.S. Appl. No. 12/748,982 Alejandro G. Blanco, filed Mar. 29, 2010.
Non Final Office Action mailed on Jun. 24, 2013 in related U.S. Appl. No. 13/183,930, Robert J Higgins, filed Jul. 15, 2011.
Sharmila et al., "Bluetooth Man-In-The-Middle Attack Based on Secure Simple Pairing using Out of Band Association model," International Conference on Control, Automation, Communication and Energy Conservation, 2009, Jun. 4-6, 2009, IEEE, pp. 1-6.
Novotny L and Hecht B., "Principles of Nano-Optics: Theoretical foundations," Cambridge University Press, Chapter 2, 2006, pp. 13-44.
Final Office Action mailed Oct. 16, 2013 in U.S. Appl. No. 13/183,930, Robert J. Higgins, filed Jul. 15, 2011.
Office Action for European Patent Application No. 10738091.7 mailed Nov. 6, 2013.
Tuecke, S., et al., "Internet X.509 Public Key Infrastructure (PKI) Proxy Certificate Profile," Network Working Group, RFC 3820, Jun. 2004, pp. 1-37.
Notice of Allowance mailed Dec. 23, 2013 in U.S. Appl. No. 12/748,982, Alejandro G. Blanco, filed Mar. 29, 2010.
Bibliographic Details at Acceptance, AU Application No. 2013368368, Jan. 27, 2016.

* cited by examiner

METHOD OF AND SYSTEM FOR AUTHENTICATING AND OPERATING PERSONAL COMMUNICATION DEVICES OVER PUBLIC SAFETY NETWORKS

REFERENCE TO RELATED APPLICATIONS

The present application is related to U.S. patent application Ser. No. 13/728,422, entitled "Method and Apparatus for Single Sign-On Collaboration Among Mobile Devices"; U.S. patent application Ser. No. 13/728,521, entitled "Method and Apparatus for Single Sign-On Collaboration Among Mobile Devices"; U.S. patent application Ser. No. 13/728,711, entitled "Method and Apparatus for Ensuring Collaboration Between a Narrowband Device and a Broadband Device"; U.S. patent application Ser. No. 13/728,752, entitled "System and Method for Scoping a User Identity Assertion to Collaborative Devices"; and U.S. patent application Ser. No. 13/728,797, entitled "Apparatus for and Method of Multi-Factor Authentication Among Collaborating Mobile Devices"; which applications are commonly owned and filed on the same date as this application and the contents of which applications are incorporated herein in their entirety by reference thereto.

FIELD OF THE DISCLOSURE

The present disclosure relates generally to a method of, and a system for, enabling a public safety (PS) person, such as a first responder at an incident scene, having a PS communications device, such as a land mobile radio or a PS smartphone, operative over a PS network, to authenticate and authorize operation of a non-PS, personal communications device, such as a personal smartphone, to capture and upload information for distribution over the PS network under specified conditions of use.

BACKGROUND

Public safety (PS) personnel, such as police officers, firefighters, paramedics, emergency medical service technicians, disaster relief workers, military rescue personnel, and like first responders respond to emergencies or incidents that endanger people and/or property and utilize PS communication devices, both handheld and vehicle-portable, while working in the field. PS communication devices include, for example, land mobile radios (LMRs), such as handheld radios and/or vehicular radios, along with remote accessories, such as remote microphones, speakers, earpieces, headsets, and the like, as well as PS smartphones, to support wireless voice communications. These primary, mission-critical devices and the infrastructure to support their operation are typically operated via a private, secure, and protected PS network governed by a PS agency, e.g., a local government or department.

PS personnel, like many members of the public at large, often carry non-PS, personal communication devices, such as personal smartphones, tablets, personal digital assistants, electronic notepads, and the like, which typically operate over public carrier communications networks, and which communicate one or more of voice, data, photo, video, and like information, over wireless, broadband, high-speed connections. Often, these non-PS devices have technical specifications and capabilities that exceed those of the PS devices. For example, many non-PS devices may have built-in cameras capable of taking photos at a higher resolution and video at a higher definition than existing PS devices. As another example, many non-PS devices can operate at high-speed voice and data rates in accordance with the Long Term Evolution (LTE) standard, but many existing PS devices operate at much slower voice and data speeds.

Despite their greater technical capabilities, non-PS devices are currently not authorized to be used for communication over the PS networks, essentially for reasons of security. Many times a first responder would desire to capture, upload and download information at an incident scene with his or her own non-PS device and distribute and share the captured information in real-time over the PS network with other first responders. In some emergency scenarios, a first responder may even want to use the personal, non-PS, device of a bystander to communicate important information to other PS personnel at the incident scene, or to the PS network. Yet, such non-PS devices are not permitted to be authenticated by the PS network and, therefore, are unavailable for use by the first responder.

Accordingly, there is a need for an improved communication system that will alleviate the aforementioned problems and enable non-PS communication devices to be used over PS networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
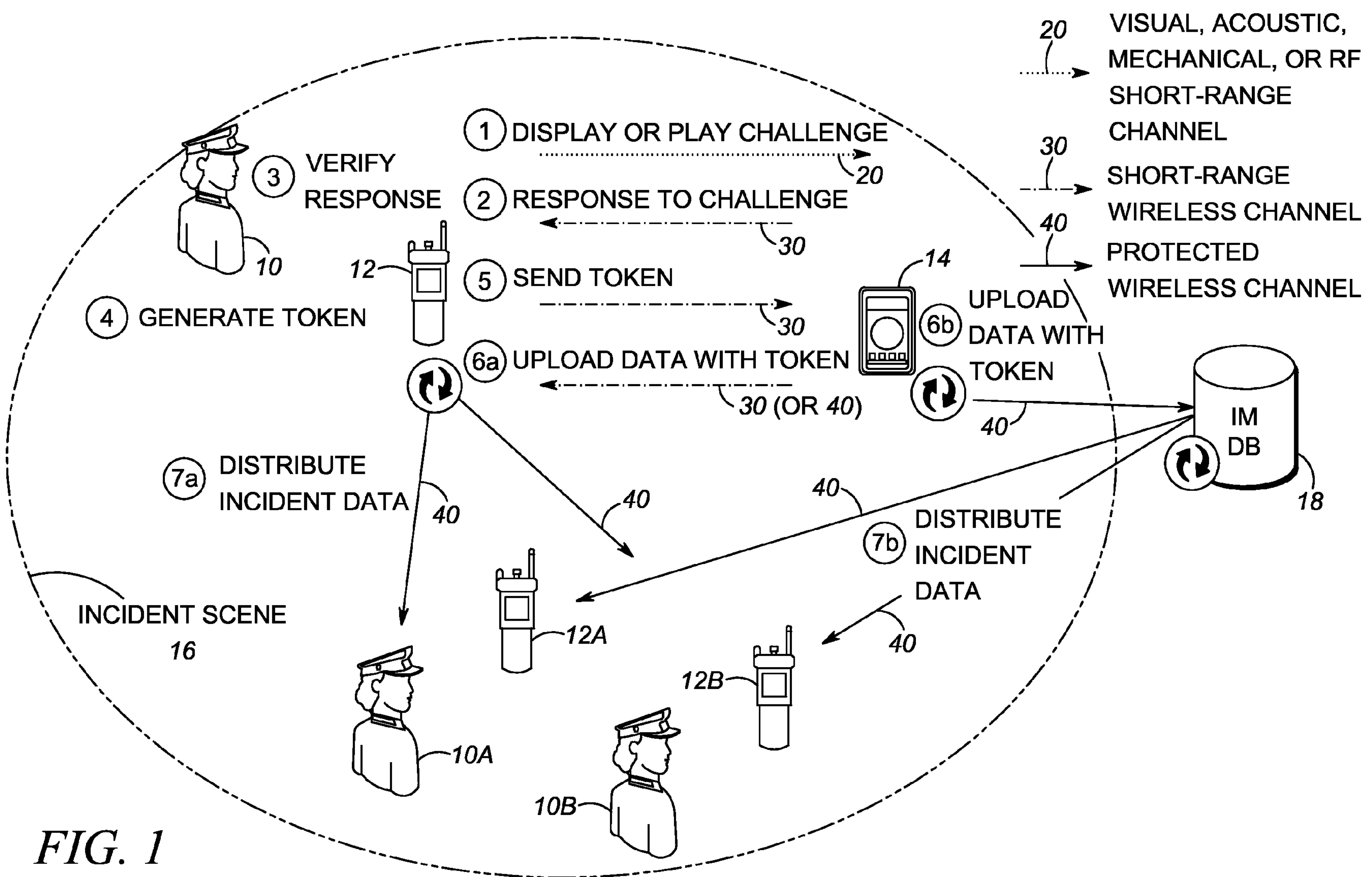
FIG. 1 is a pictorial view of a method of, and a system for, enabling a PS person having a PS communications device to authenticate and authorize operation of a non-PS, personal communications device over a PS network by employing local authentication in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a method of enabling a public safety (PS) person, such as a first responder, having a PS communications device, such as a land mobile radio or a PS smartphone, operative over a PS network, to authenticate and authorize operation of a non-PS, personal communications device, such as a personal smartphone, over the PS network. Preferably, the operation is limited to performance of specified tasks, such as recording and distributing video information from an incident scene. The method is performed by generating a challenge, by issuing the challenge from the PS device over a first, wireless channel, by issuing a response to the challenge from the personal device over a second, wireless channel different from the first channel, and by verifying the response. Preferably, the devices are in close proximity with each other during execution of the challenge-response protocol to ensure that the PS device and the personal device are both operated by the same person or by an authorized person, and that no other unauthorized person can intercept, modify, or otherwise interfere with the challenge-response protocol. Advantageously, the first and second channels are short-range channels. The first channel can be a visual, acoustic, mechanical, or radio frequency channel. The second channel can, for example, be a Bluetooth® channel of limited range, or a near field communication (NFC) channel.

A conditional token, having specified conditions under which the personal device is permitted to be operated over the PS network, is generated and sent to the personal device for acknowledgement, again while the PS device and the personal device are in close proximity to each other to avoid interference by an unauthorized person. The personal device is operated to capture information at an incident scene, to attach the conditional token to the captured information, and to upload the captured information with the attached conditional token, to permit distribution of the captured information over a third, wireless channel different from the first and second channels in accordance with the specified conditions of the attached conditional token. The third channel is preferably a secure, protected, wireless channel. The specified conditions may preferably include at least one of an expiration time after which the personal device is automatically prevented from distributing the captured information over the PS network, a geographical location of the incident scene, a timestamp, an identifier of the incident scene, an identifier of the jurisdiction, an identifier of the PS device, an identifier of the personal device, an identifier of the PS person operating the PS device, and like parameters of interest.

Advantageously, the generating of the challenge, the verifying of the response, the generating of the conditional token, and the sending of the conditional token are either performed by the PS device, or by an authentication server remote from the PS device. The uploading of the captured information with the attached conditional token is either sent to the PS device, or to a database of an incident media server remote from the PS device, for distribution over the PS network to a command center, or to other PS devices operated by other PS persons at the incident scene.

A system, in accordance with another aspect of this disclosure, is operative for enabling a public safety (PS) person having a PS communications device operative over a PS network, to authenticate and authorize operation of a non-PS, personal communications device over the PS network. The PS device is operated to issue a challenge over a first, wireless channel. The personal device is operated to issue a response to the challenge over a second, wireless channel different from the first channel. The system is operative for verifying the response, for issuing a conditional token having specified conditions under which the personal device is permitted to be operated over the PS network, and for sending the conditional token to the personal device for acknowledgement. The personal device is operated to capture information at an incident scene, to attach the conditional token to the captured information, and to upload the captured information with the attached conditional token, to permit distribution of the captured information over a third, wireless channel different from the first and second channels in accordance with the specified conditions of the attached conditional token.

Turning now to the drawings, reference numeral 10 generally identifies a public safety (PS) person, such as a police officer, a firefighter, a paramedic, an emergency medical service technician, a disaster relief worker, a military rescue person, and a like first responder, who responds to an incident or emergency in the field at an incident scene 16 at which people and/or property are endangered. The PS person 10 normally operates a PS communications device 12, such as a handheld or vehicle-portable land mobile radio (LMR), or a PS smartphone, operative over a private, secure, and protected PS network, typically administered by a local governmental agency, such as a police department, to report details of the incident and/or to upload and/or download information relating to the incident. Other PS personnel 10A, 10B having their own PS devices 12A, 12B may also be present at the incident scene 16.

As noted above, the PS person 10 often carries, or has access to, a non-PS, personal communications device 14, such as a personal smartphone, a tablet, a personal digital assistant, an electronic notepad, and the like, which typically has better specifications and technical capabilities than the PS device 12. Yet, despite its greater technical capabilities, the personal device 14, which normally communicates over public carrier networks, is currently not authorized to be used for communication over the private PS network, essentially for reasons of security. One aspect of this disclosure is to enable the PS person 10 to capture, upload and download information at the incident scene 16 with his or her own personal device 14, or with a bystander's personal device, and distribute the captured information in real-time over the PS network, for example, to share the captured information with a command center or with the other PS personnel 10A, 10B operating their own PS devices 12A, 12B.

In accordance with this disclosure, the personal device 14 is authenticated and authorized using a proximity-based, challenge-response protocol. A close proximity between the personal device 14 and the PS device 12 establishes a trust relationship that the personal device 14 is being operated either by the same PS person 10, or by an authorized person, and not by an unauthorized person. In FIG. 1, the action 1 indicates that the PS device 12 is operated to generate and issue a challenge to the personal device 14 over a first, short-range, wireless channel 20; the action 2 indicates that the personal device 14 is operated to issue a response to the challenge over a second, short-range, wireless channel 30 different from the first channel 20; and the action 3 in FIG. 1 indicates that the PS device 12 verifies the response.

By way of example, the PS device 12 can display an image, or display a bar code symbol, or display a sequence or pattern of lights over an optical channel 20 as action 1, and the personal device 14 can capture and process the displayed image, symbol or light sequence/pattern and respond over the short-range channel 30 as action 2. As another example, the PS device 12 can play a sound over an acoustical channel 20 as action 1, and the personal device 14 can record and process the sound and respond over the short-range channel 30 as action 2. As still another example, the PS device 12 can generate a vibration or make physical contact with (i.e., bump) the personal device 14 over a mechanical channel 20 as action 1, and the personal device 14 can sense the vibration/bump and respond over the short-range channel 30 as action 2. As yet another example, the PS device 12 can transmit a radio frequency (RF) signal over an RF channel 20 as action 1, and the personal device 14 can receive and process the transmitted signal and respond over the short-range channel 30 as action 2. Thus, the first channel 20 can be a visual, acoustic, mechanical, or radio frequency channel. The second channel 30 can be a Bluetooth® channel of limited range, or a near field communication (NFC) channel.

Once the response is verified, the PS device 12 in FIG. 1 generates a conditional token as action 4, and the conditional token is sent to the personal device 14 for acknowledgement as action 5. The conditional token has specified conditions under which the personal device 14 is permitted to be authenticated and operated over the PS network. The specified conditions may preferably include an expiration time after which the personal device 14 is automatically prevented from distributing any captured information, as described below, over the PS network, and/or a geographical location of the incident scene 16, and/or a timestamp, and/or an identifier of the incident scene 16, and/or an identifier of the jurisdiction, and/or an identifier of the PS device 12, and/or an identifier of the personal device 14, and/or an identifier of the PS person 10 operating the PS device 12, and/or like parameters of interest.

The personal device 14 can now be operated by the PS person 10, or by another authorized person, to capture information at the incident scene 16, to attach the conditional token to the captured information, and to upload the captured information with the attached conditional token, as action 6*a*, to the PS device 12 over the second channel 30. After verifying the attached conditional token, the PS device 12 can now distribute the captured information, as action 7*a*, over a third, wireless channel 40 different from the first channel 20 and the second channel 30 to the other PS devices 12A, 12B in accordance with the specified conditions of the attached conditional token. The third channel 40 is preferably a secure, protected channel administered by the PS department or agency, or established in an ad hoc manner by the PS person 10.

For better bandwidth efficiency and extended range, the uploading of the captured information with the attached conditional token to the PS device 12 (action 6*a*) can be performed over the third channel 40. Rather than uploading the captured information with the attached conditional token to the PS device 12, the personal device 14 can upload the captured information with the attached conditional token, as action 6*b*, to a database of an incident media server (IMDB) 18 remote from the PS device 12, for distribution over the PS network, as action 7*b*, to the other PS devices 12A, 12B operated by the other PS persons 10A, 10B at the incident scene 16.

Figure 2:
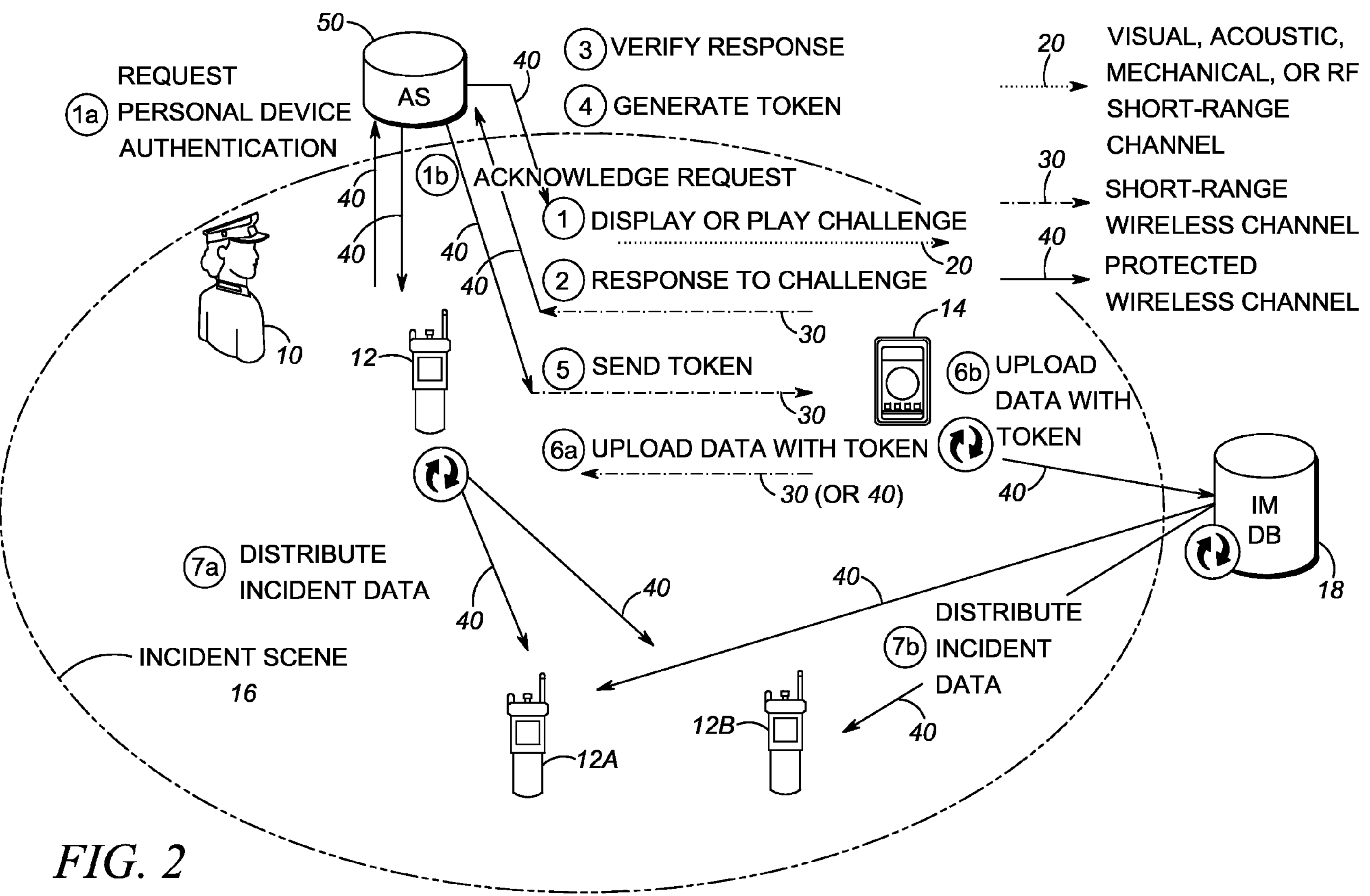
FIG. 2 is a pictorial view of a method of, and a system for, enabling a PS person having a PS communications device to authenticate and authorize operation of a non-PS, personal communications device over a PS network by employing central or remote authentication in accordance with the present disclosure.

As described in FIG. 1, the PS device 12 generates the challenge, verifies the response, generates the conditional token, and sends the conditional token to the personal device 14 for acknowledgement in a local authentication procedure. FIG. 2 depicts an alternative, remote or central authentication procedure in which the challenge is generated, the response is verified, and the conditional token is generated and sent to the personal device 14 by an authentication server (AS) 50 remote from the PS device 14. In FIG. 2, all communications between the AS 50 and the personal device 14 go through the PS device 12, e.g., over the first communication channel 20 and the second communication channel 30 between the PS device 12 and the personal device 14, and over the third communication channel 40 between the PS device 12 and the AS 50, because no direct communication link exists between the personal device 14 and the AS 50.

Thus, as shown in FIG. 2, where like reference numerals as those employed in FIG. 1 have been used, the PS device 12 first requests permission from the AS 50 over the third channel 40 to allow authentication of the personal device 14 as action 1*a*, and the AS 50 responsively grants the request over the third channel 40 as action 1*b*. Then, the AS 50 generates a challenge and issues (displays or plays) the challenge from the PS device 12, as described above, as the action 1, to the personal device 14 over the first, short-range, wireless channel 20; the action 2 indicates that the personal device 14 is operated to issue a response to the challenge over the second, short-range, wireless channel 30 different from the first channel 20 to the PS device 12 and, in turn, to the AS 50 over the third channel 40; and the action 3 indicates that the AS 50 verifies the response. Once the response is verified, the AS 50 generates a conditional token as action 4, and the AS 50 sends the conditional token to the PS device 12 over the third channel 40 and, in turn, to the personal device 14 over the second channel 30 for acknowledgement as action 5.

The personal device 14 can now be operated by the same PS person 10, or by another authorized person, to capture information at the incident scene 16, to attach the conditional token to the captured information, and to upload the captured information with the attached conditional token, as action 6*a*, to the PS device 12 over the second channel 30. After verifying the attached conditional token, the PS device 12 can now distribute the captured information, as action 7*a*, over the third, wireless channel 40 to the other PS devices 12A, 12B in accordance with the specified conditions of the attached conditional token.

For better bandwidth efficiency and extended range, the uploading of the captured information with the attached conditional token to the PS device 12 (action 6*a*) can be performed over the third channel 40. Rather than uploading the captured information with the attached conditional token to the PS device 12, the personal device 14 can upload the captured information with the attached conditional token, as action 6*b*, to the database of an incident media server (IMDB) 18 remote from the PS device 12, for distribution over the PS network, as action 7*b*, to the other PS devices 12A, 12B operated by the other PS persons 10A, 10B at the incident scene 16.

As used herein, the term "PS network" includes not only a private network, but also a public carrier network, such as a carrier radio access network (RAN) in which a secure connection or "tunnel" is first established. For example, the third protected wireless channel 40 between the PS device 12 and the AS 50 need not be a private network, but could be a public carrier network over which the tunnel is first established.

Figure 3:
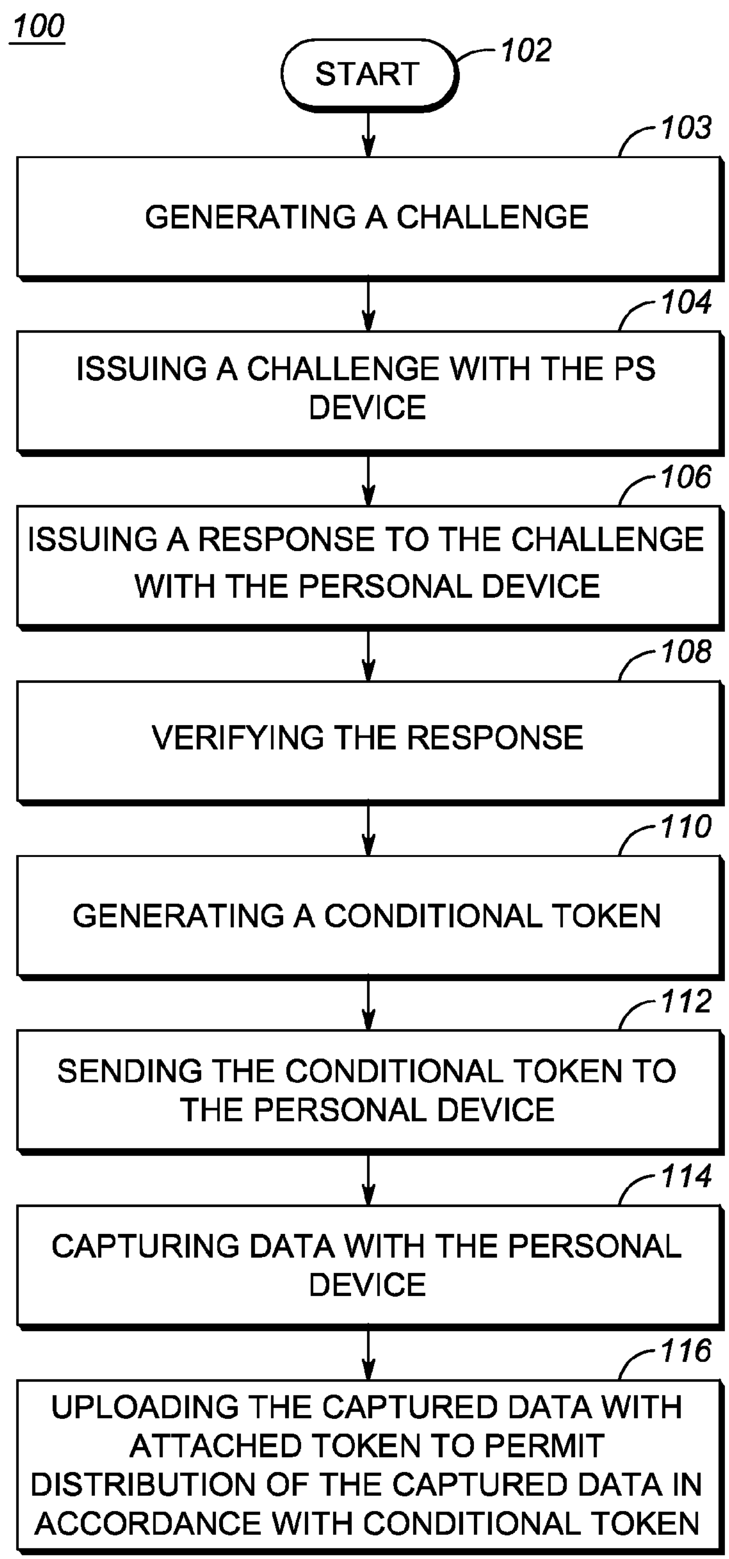
FIG. 3 is a flow chart depicting steps performed in accordance with a method in accordance with the present disclosure.

The flow chart 100 of FIG. 3 depicts the method of enabling the PS person 10 having the PS device 12 to authenticate and authorize operation of the personal device 14 over the PS network. Beginning at start step 102, the method is performed by generating a challenge by the PS device 12 or by the AS 50 in step 103, by issuing the challenge over the first, wireless channel 20 by operation of the PS device 12 in step 104; by issuing a response to the challenge over the second, wireless channel 30 by operation of the personal device 14 in step 106; by verifying the response by operation of the PS device 12 or the AS 50 in step 108; by generating a conditional token having specified conditions under which the personal device 14 is permitted to be operated over the PS network by operation of the PS device 12 or the AS 50 in step 110; by sending the conditional token to the personal device 14 for acknowledgement in step 112; by capturing information at the incident scene 16 by operation of the personal device 14 in step 114; and by attaching the conditional token to the captured information to authenticate operation of the personal device 14 over the PS network and by uploading the captured information with the attached conditional token to permit distribution of the captured information over the third, wireless channel 40 in accordance with the specified conditions of the attached conditional token in step 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of enabling a public safety (PS) person having a PS communications device operative over a PS network, to authenticate and authorize operation over the PS network of a non-PS, personal communications device, operative over a non-PS network, the method comprising:

generating a challenge; issuing to the personal device, by a PS device over the PS network, the challenge over a first, wireless channel;

issuing, by the personal device to the PS device, a response to the challenge over a second, wireless channel different from the first channel;

verifying the response;

in response to verifying the response to the challenge over the second, wireless channel, generating a conditional token having specified conditions under which the personal device is permitted to distribute information associated with an emergency incident upon meeting the specified conditions over the PS network;

sending, by the PS device to the personal device, the conditional token;

capturing information at an emergency incident scene by operation of the personal device;

attaching, by the personal device, the conditional token to the captured information, and uploading, by the personal device, the captured information with the attached conditional token, wherein, upon meeting the specified conditions, the captured information is distributed to one or more other PS devices located at the emergency incident scene over the PS network.

2. The method of claim 1, wherein the issuing of the challenge and the issuing of the response are performed when the PS device and the personal device are in close proximity to each other, and wherein the first channel and the second channel are short-range wireless channels.

3. The method of claim 1, wherein the verifying of the response and the generating the conditional token are performed by the PS device.

4. The method of claim 1, wherein the generating of the challenge comprises receiving, by the PS device from an authentication server remote from the PS device, the challenge;

wherein the verifying of the response comprises receiving, by the authentication server from the PS device, the response and verifying, by the authentication server, the response; and wherein the generating of the conditional token comprises generating, by the authentication server, the conditional token and conveying, by the authentication server to the PS device, the conditional token.

5. The method of claim 1, wherein the generating of the conditional token is performed by configuring the specified conditions to include at least one of an expiration time after which the personal device is automatically prevented from distributing the captured information over the PS network, a geographical location of the incident scene, a timestamp, an identifier of the incident scene, an identifier of the jurisdiction, an identifier of the PS device, an identifier of the personal device, and an identifier of the PS person operating the PS device.

6. The method of claim 1, wherein the uploading of the captured information with the attached conditional token is sent to the PS device over the second channel for distribution over a third wireless channel different from the first and second channels over the PS network to other PS devices operated by other PS persons at the incident scene.

7. The method of claim 1, wherein the uploading of the captured information with the attached conditional token is sent to the PS device over a third wireless channel different from the first and second channels for distribution over the third channel over the PS network to other PS devices operated by other PS persons at the incident scene.

8. The method of claim 1, wherein the uploading of the captured information with the attached conditional token is sent to a database of an incident media server remote from the PS device for distribution over the PS network to other PS devices operated by other PS persons at the incident scene.

9. The method of claim 1, wherein the PS device is operated by the PS person, and wherein the personal device is operated by one of the PS person and an authorized person at the incident scene.

10. A system for enabling a public safety (PS) person having a PS communications device operative over a PS network, to authenticate and authorize operation over the PS network of a non-PS, personal communications device, operative over a non-PS network, the system comprising:

the PS device being operated for issuing a challenge to the personal device over a first, wireless channel;

the personal device being operated for issuing a response to the challenge to the PS device over a second, wireless channel different from the first channel;

the system being operative for verifying the response and, in response to verifying the response to the challenge over the second, wireless channel, generating a conditional token having specified conditions under which the personal device is permitted to distribute information associated with an emergency incident upon meeting the specified conditions over the PS network;

the PS device being operated for sending the conditional token to the personal device for acknowledgement;

the personal device being operated for capturing information at an emergency incident scene;

the personal device being operated for attaching the conditional token to the captured information and for uploading the captured information with the attached conditional token, wherein, upon meeting the specified conditions, the captured information is distributed to one or more other PS devices located at the emergency incident scene over the PS network.

11. The system of claim 10, wherein the PS device is operative for issuing the challenge, and wherein the personal device is operative for issuing the response, when the PS device and the personal device are in close proximity to each other, and wherein the first channel and the second channel are short-range, wireless channels.

12. The system of claim 10, wherein the first channel is one of a visual, acoustic, mechanical, and radio frequency channel, and wherein the second channel is one of a Bluetooth® channel and a near field communication (NFC) channel.

13. The system of claim 10, wherein the PS device is operative for verifying the response, generating the conditional token, and sending the conditional token to the personal device.

14. The system of claim 10, further comprising:

an authentication server remote from the PS device and operative for receiving the response from the PS device, verifying the response, generating the conditional token, and sending the conditional token to the personal device via the PS device.

15. The system of claim 10, wherein the specified conditions include at least one of an expiration time after which the personal device is automatically prevented from distributing the captured information over the PS network, a geographical location of the incident scene, a timestamp, an identifier of the incident scene, an identifier of the jurisdiction, an identifier of the PS device, an identifier of the personal device, and an identifier of the PS person operating the PS device.

16. The system of claim 10, wherein the personal device is operative for the uploading of the captured information with the attached conditional token to the PS device over the second channel for distribution over a third wireless channel different from the first and second channels over the PS network to other PS devices operated by other PS persons at the incident scene.

17. The system of claim 10, wherein the personal device is operative for the uploading of the captured information with the attached conditional token to the PS device over a third wireless channel different from the first and second channels for distribution over the third channel over the PS network to other PS devices operated by other PS persons at the incident scene.

18. The system of claim 17, wherein the third channel is a secure, protected, wireless channel.

19. The system of claim 10, wherein the personal device is operative for the uploading of the captured information with the attached conditional token to a database of an incident media server remote from the PS device for distribution over the PS network to other PS devices operated by other PS persons at the incident scene.

* * * * *